Jan. 31, 1928.

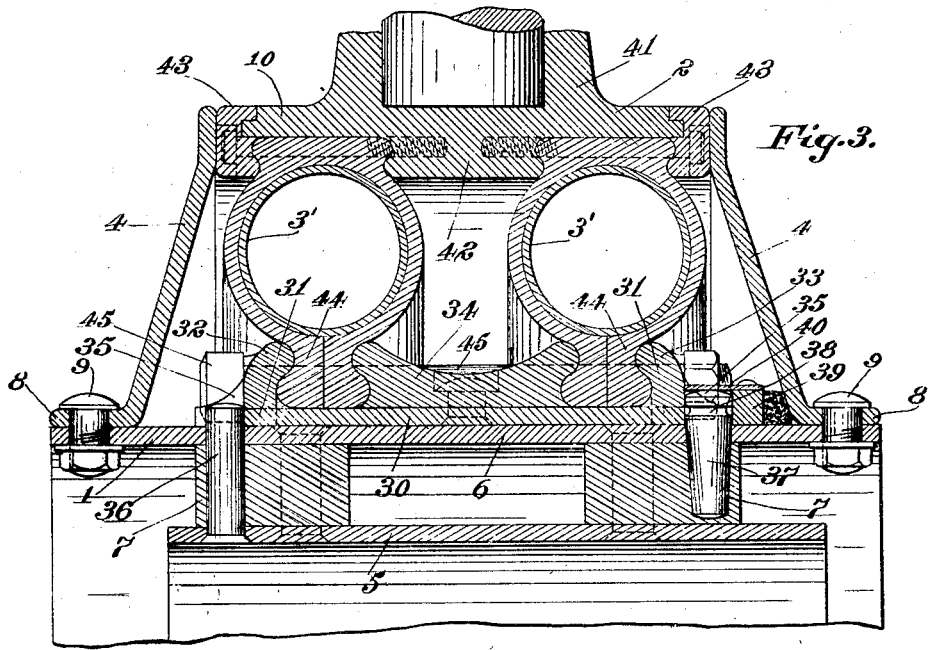
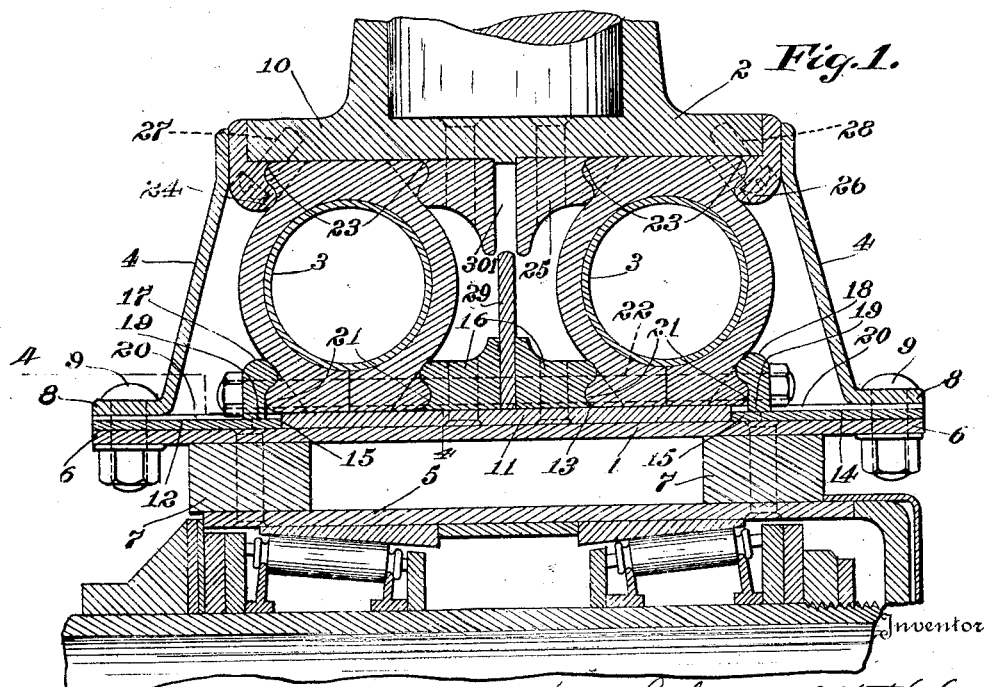

S. C. HATFIELD 1,657,535

ELASTIC WHEEL

Original Filed Feb. 8, 1917    2 Sheets-Sheet 2

Inventor
Schuyler C Hatfield

Witnesses.

By
Attorney

Patented Jan. 31, 1928.

1,657,535

UNITED STATES PATENT OFFICE.

SCHUYLER C. HATFIELD, OF BALTIMORE, MARYLAND.

ELASTIC WHEEL.

Application filed February 8, 1917, Serial No. 147,374. Renewed March 24, 1922. Serial No. 546,518.

The elastic wheel referred to herein is of the general type described in my U. S. Patent No. 1,105,654, of August 4, 1914, consisting of an outer section and an inner or hub section with an annular pneumatic pad between the sections and means for limiting the relative motion of the parts to a radial plane.

In the distribution of elastic wheels, it is necessary to equip vehicles already provided with wheels and bearings of various makes and there is considerable variation in the diameter of the shafts and spindles and hence of the bearings and more particularly, of the moving or rotary portion of the bearings to which the elastic wheels must be fitted. In my Patent No. 1,410,300 dated March 21, 1922, Serial No. 147,373, I have described a wheel or a type of wheel which, though built in various sizes and adapted to be applied to various shafts and bearings, includes a hub sleeve which is of uniform diameter in all the wheels to be manufactured so that these rings and all parts of the wheel outside of the rings may be made interchangeable and of the same standard size except for the necessary variation in the length of the spokes and the circumference and diameter of the outer rim in wheels of the different sizes. Inside of this sleeve are one or more spacing rings adapted to be fitted to the shaft, or if it is a front wheel, the outer sleeve of the bearing.

While the wheels which have been shown in my previous patents have a single pad between the two sections, it is very desirable in the wheels which are intended to carry heavy loads, particularly for trucks, to use two pads side by side. The principal objection to this, incident to the wheels which have been previously so constructed, is that the inside pad is difficult of access unless the entire wheel is removed, and the present invention relates to the mounting of the pads, whether there be one, two or more, on a movable member which, while it is conveniently locked to the hub when the wheel is set up, may be removed from the hub at will and when it is removed will afford convenient access to the pad or pads. In the form of the invention shown, a removable ring or sleeve to which the pads are attached is seated on or passed over the standard size sleeve which is mounted on the bearings or on the shaft as above described, but the standard size sleeve or cylinder is not a necessary element of the present invention. The invention relates to the mounting of the pad or pads on a removable sleeve or ring with means for locking the same to the hub.

In the accompanying drawings, I have illustrated an elastic wheel to which my invention in its preferred form has been applied.

Figure 1 is a radial section on one side only of the axis of an elastic wheel, the outer rim and spokes being omitted;

Figure 3 is a section similar to Figure 1 of a slightly modified form; and

Figure 2:
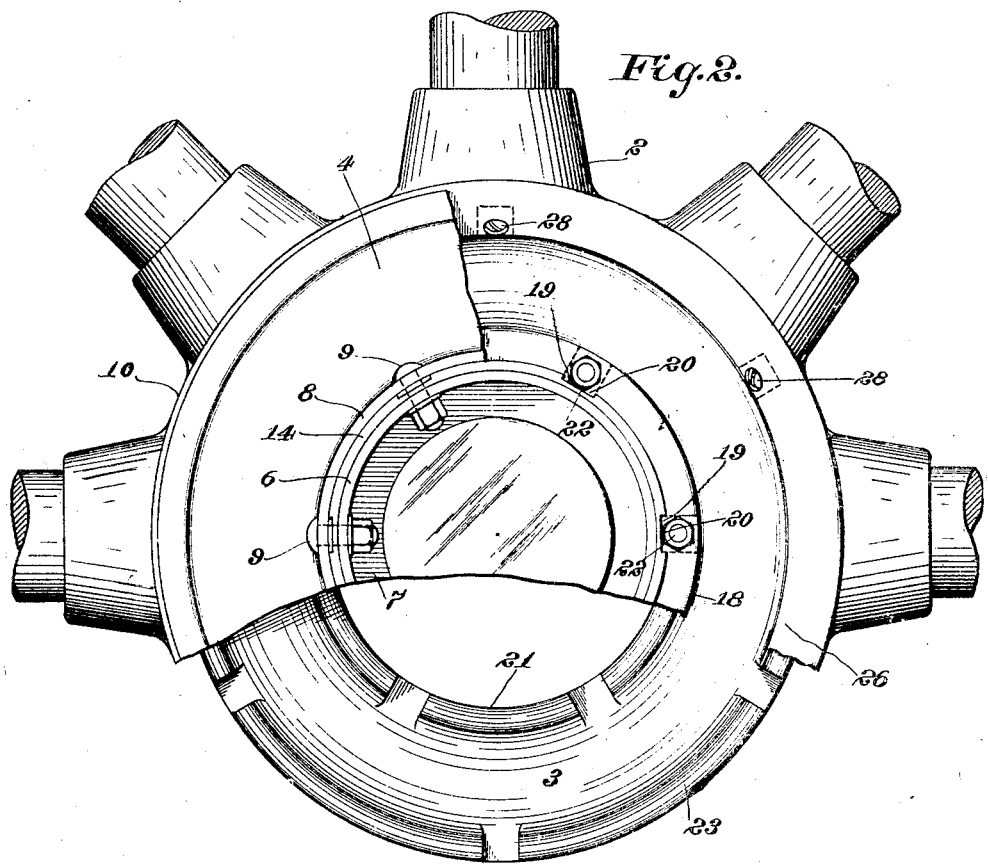
Figure 2 is a fragmentary view of the same taken in the direction of the axis.
Figure 4:
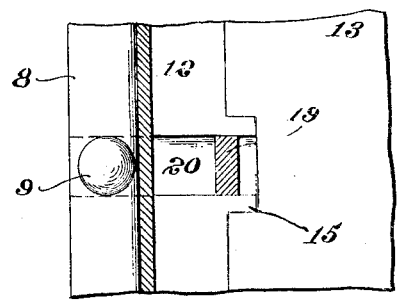
Figure 4 is a sectional plan on the line 4, 4 of Figure 1.

Referring to the drawings by numerals, the device consists of an inner or hub section 1 and an outer or rim section 2 with annular pads 3 between the sections and annular plates 4 for guiding the parts and limiting the relative motion of the sections 1 and 2 to a radial plane. The hub section 1 is fastened either to the outer sleeve 5 of the bearing, or to the shaft, if it is a driving wheel. In the form of wheel illustrated, there is a standard size sleeve or cylinder 6 supported on the sleeve 5 by spacing rings 7 which may be cut away internally to fit the sleeve 5 of whatever size it happens to be. The rings 7 are fastened both to the sleeve 5 and to the sleeve or cylinder 6 so that the parts rotate together.

The plates 4 are shown in the present instance in the form in which they are claimed in my second mentioned patent, that is, they have each a cylindrical flange 8, each overlying one end of the sleeve 6 and bolted thereto by radial bolts 9 which are spaced around the circumference of the flange 8 and the sleeve 6. The outer section 2 which carries the spokes, outer rim and tire not shown, is provided with an inner rim 10 engaged by the peripheries of the plates 4 to guide the outer section.

The pads 3 are between the sections and serve to cushion the parts and dampen their relative motion. The present invention relates to the manner of mounting these pads.

In the form of the invention shown in Figures 1 and 2, there is a sleeve 11 divided transversely to its axis into three parts, 12, 13 and 14, occupying one end, the entire central portion, and the other end of the hub respectively. This sleeve is of a diameter sufficient to enable it to slide over the sleeve 6. The sections 12, 13 and 14 interengage so that relative rotation is prevented by means of interlocking teeth 15. Co-operating with the sleeve 11 to hold the pads or tires in position is a central, peripheral bead 16 secured to the central section 13 of the sleeve 11 and end beads 17 and 18 each having teeth 19 projecting inward radially and fitting in slots 20 in the sleeve 11 between the edge sections and the central section. The inner periphery of each tire is provided with an inner bead 21 which may be split and the beads 16, 17 and 18 are drawn together and caused to grip the tire beads by means of bolts 22 parallel to the axis of the wheel and passing through the beads 16, 17, 18 and 21 of the hub and of the tires respectively at registering points, the bolts 22 being sufficiently numerous to cause the tires to be gripped with substantially uniform intensity. The outer periphery of each pad is provided with a bead 23 and these are gripped and held in position in relation to the inner rim 10 of the outer section by means of beads 24, 25 and 26 at the inner edge, the center and the outer edge of the inner rim respectively. These beads form no part of the present invention and they may be secured by any suitable means, as pins or screws 27 and 28. In the form of the invention shown, the parts have guiding means in addition to the plates 4 in the form of radial plate 29 on the hub engaging a groove 301 shown as formed in the bead 25 on the outer section.

The parts are assembled by first securing the tires or pads 3 to the inner rim of the outer section and then attaching the central section 13 of the ring 11 of the hub section to the inner peripheries of the tires. This is done by placing the central section 13 in position relatively to the beads 21, the bead 16 being between the inner beads 21 of the pads, and then placing the outer or end beads 17 and 18 in position with the teeth 19 in the slots 20, inserting the bolts 22 and then tightening them. If it has been removed, the ring or end section 12 is seated in the position in which it is shown between the flange 8 and the end of the sleeve 6 and the radial bolts 9 on this side are inserted. The central sleeve section 13 is then slid over the sleeve 6 until the teeth 15 are brought into engagement and the inner rim bears against the plate 4 on the side of the section 12. Then the ring or section 14 is seated in a manner similar to that of the section 12; the annular plate 4 on that side is likewise seated with its flange 8 encircling the end of the section 14. The bolts 9 on the outside are seated and tightened and the assembling operation is complete.

It will be easily apparent that if for any reason, the pad 3 on the inner side, which in the present instance is considered the left side, should fail, access may be had to it by jacking up the wheel, removing the bolts 9 on the right side, taking off the plate 4 and removing the pads with the central section 13 of the ring 11, the outer section of the wheel being preferably removed at the same time.

Referring to the form shown in Figure 3, we have an elastic wheel similar in general structure to the one just described, differing mainly as to the details of the device for securing the pads 3 to the hub and this is similar in that it is removable with both pads from either side except for the obstruction on one side due to the body of the frame of the vehicle. Access to the pads is had by removing one plate 4 and sliding the sleeve which carries the pads off of the hub. The pads are carried by a sleeve or cylinder 30 adapted to slide over the hub and notched or toothed at 31 at each edge to engage correspondingly notched rings 32 and 33, each provided with a tire engaging bead which co-operates with the central bead 34 on the sleeve. Each of the rings 32 and 33 is notched as to its outer surface at 35 to engage radial pins which are seated in the hub, the pins 36 on the inside, i. e., the side toward the vehicle body, being most conveniently made to be permanently attached to the hub, and the pins 37 on the outside being preferably tapering and provided with any suitable means by which they may be withdrawn, as a groove 38 to be engaged by a screw driver for prying the pins loose. The pins 37 are in turn held in position by a locking ring 39 having a cover plate 40 which overlies the pins 37 when in position and prevents them from being withdrawn until the ring is removed. The pads may be secured to the inner rim 41 of the outer section of the wheel by a fixed central bead 42 and removable edge beads 43. The inner peripheral beads 44 of the pads are passed over the cylinder 30 from each end and clamped against the central bead 34 by the edge beads 32 and 33 which are pressed inward and held by the bolts 45 spaced at suitable intervals. When these parts have been thus clamped together, the sleeve 30 and the rings 32 and 33 are passed over the hub from the right side as seen in Figure 3. the notches 35 in the ring 32 receiving the radial pins 36. When these parts are in position, the pins 37 are driven into their sockets and the locking ring 39 is passed over the hub until the plate 40 covers the pins. The plate 4 at the right is then seated and fastened by bolts 9.

To obtain access to the inside tire, the outside plate 4 is removed, the locking ring 39 is likewise removed, the pins 37 are withdrawn when the sleeve 30 with the rings 32 and 33 are withdrawn carrying with them the pads and the outer section of the wheel. In this way convenient access is had to the inner pad though one face of the outer pad is exposed by merely removing the plate 4.

Either of these devices may be applied in an obvious manner to a wheel having but a single pad, access to the inner or left side of the pad, as seen in Figure 3, being had in the manner already described.

I have thus described specifically and in detail two embodiments of my invention in order that its nature and operation may be clearly understood; however, the specific terms herein are used descriptively rather than in their limiting sense and the scope of the invention is defined in the claims:

1. In an elastic wheel, a hub section, an outer section, a plurality of pneumatic pads between the sections, a sleeve fitting over the hub and a central bead to co-operate with the inner peripheries of the pads, two toothed rings each being notched to engage the sleeve which is correspondingly notched and toothed, each said ring carrying a bead to engage a pad, means for drawing the rings toward the central bead to grip the peripheral portions of the pads, and means for preventing rotation of the rings relatively to the hub.

2. In an elastic wheel in combination, an inner or hub section, an outer or rim section, cushioning means comprising an annular pad between the sections, means for securing the outer periphery of the pad to the outer section, a sleeve adapted to slide over the hub section with means for securing the inner periphery of the pad thereto, the sleeve being apertured at the side, and removable means on the hub to engage the apertures at the side of the sleeve to prevent rotation of the sleeve and pad relatively to the hub.

Signed by me at Baltimore, Maryland, this 31st day of January, 1917.

SCHUYLER C. HATFIELD.